(12) United States Patent
Maeda (10) Patent No.: US 7,524,118 B2
(45) Date of Patent: Apr. 28, 2009

(54) MODE-SETTING DEVICE FOR PHOTOGRAPHING DEVICE

(75) Inventor: Hirokazu Maeda, Saitama (JP)

(73) Assignee: Hoya Corporation, Tokyo (JP)

( * ) Notice: Subject to any disclaimer, the term of this patent is extended or adjusted under 35 U.S.C. 154(b) by 361 days.

(21) Appl. No.: 11/426,320

(22) Filed: Jun. 26, 2006

(65) Prior Publication Data

US 2006/0291850 A1 Dec. 28, 2006

(30) Foreign Application Priority Data

Jun. 24, 2005 (JP) ............... 2005-184666

(51) Int. Cl.
*G03B 5/02* (2006.01)
(52) U.S. Cl. .................. 396/349; 348/333.01
(58) Field of Classification Search .......... 396/349, 396/372, 333.01; 348/333.01
See application file for complete search history.

(56) References Cited

U.S. PATENT DOCUMENTS

| | | | | |
|---|---|---|---|---|
| 6,272,289 B1 * | 8/2001 | Washisu | ............ | 396/55 |
| 6,393,215 B1 * | 5/2002 | Washisu | ............ | 396/52 |
| 6,809,773 B1 * | 10/2004 | Watarai et al. | ............ | 348/345 |
| 2001/0028397 A1 * | 10/2001 | Nakamura | ............ | 348/222 |
| 2004/0001158 A1 * | 1/2004 | Aoki | ............ | 348/345 |
| 2005/0046724 A1 * | 3/2005 | Kagaya | ............ | 348/333.01 |
| 2005/0140789 A1 * | 6/2005 | Yasuda | ............ | 348/207.2 |
| 2005/0168611 A1 | 8/2005 | Yamaya | ............ | 348/333.01 |
| 2006/0044462 A1 | 3/2006 | Tatamiya et al. | ............ | 348/372 |

FOREIGN PATENT DOCUMENTS

JP 2005-101951 4/2005

OTHER PUBLICATIONS

English language Abstract of JP 2005-101951.

* cited by examiner

*Primary Examiner*—W. B. Perkey
*Assistant Examiner*—Warren K Fenwick
(74) *Attorney, Agent, or Firm*—Greenblum & Bernstein, P.L.C.

(57) ABSTRACT

A mode dial mechanism for a photographing device comprising a photographing lens, according to the present invention, includes a lens mover, a mode dial, and a mode judge. The lens mover moves the photographing lens. The mode dial is for selecting a mode from a plurality of modes, including a lens housing mode where the photographing lens is housed in a housed position which is inside the photographing device. The mode judge determines whether the lens housing mode should be set or not, when the lens housing mode is selected. When the mode judge determines that the lens housing mode should be set, the lens housing mode is set, and the lens mover moves the photographing lens to the housed position.

9 Claims, 9 Drawing Sheets

MODE-SETTING DEVICE FOR PHOTOGRAPHING DEVICE

BACKGROUND OF THE INVENTION

1. Field of the Invention

The present invention relates to a mode-setting device, and especially relates to a mode-setting device for photographing devices, such as cameras.

2. Description of the Related Art

Generally, in photographing devices such as cameras and video recorders, various photographing modes and so on can be selected or set. A mode dial, as a mode-setting device, has been used for selecting a desired mode from a plurality of selectable modes. On mode dials, generally, a plurality of selectable modes are marked, and a user moves a mode dial to set a mark of a selecting mode to be in a predetermined rotation position.

On the other hand, in some photographing devices, a photographing lens is automatically housed, when a predetermined mode is selected for protecting the photographing lens.

In case a mode where a photographing lens should not be housed is selected, the photographing lens can be housed once, and then extended. That is, during the mode dial operation, when a mark representing a mode where the photographing lens is housed passes a predetermined rotation position for setting a mode, the photographing lens can be housed. Then, the mode dial can be moved further, and when another mark representing another mode where the photographing lens does not need to be housed passes the predetermined rotation position, the photographing lens can be extended. Due to these unnecessary movements of the photographing lens, electric power is unnecessarily consumed, and the operations take unnecessary time.

When the mark of a mode where the photographing lens should be housed is the first or the last mark on a mode dial, the aforementioned unnecessary movement of the photographing lens, including housing and extending the photographing lens can be prevented. However, for such a mode dial, the operational convenience is low, and the time required for operations is longer than for an endless mode dial, because rotating operations can be interrupted when the mode dial is in the end position.

Further, when a mode where a photographing lens is housed is selected without a mode dial, the selection operation becomes complicated, and the structure of the photographing device can be complex.

SUMMARY OF THE INVENTION

Therefore, an objective of the present invention is to provide a mode-setting device, such as a mode dial mechanism, for a photographing device that can prevent unnecessary operations and that has high operational convenience.

A mode dial mechanism for a photographing device comprising a photographing lens, according to the present invention, includes a lens mover, a mode dial, and a mode judge. The lens mover moves the photographing lens. The mode dial is for selecting a mode from a plurality of modes, including a lens housing mode where the photographing lens is housed in a housed position, which is inside the photographing device. The mode judge determines whether the lens housing mode should be set or not, when the lens housing mode is selected. When the mode judge judges that the lens housing mode should be set, the lens housing mode is set and the lens mover moves the photographing lens to the housed position.

A mode-setting device for a photographing device comprising a photographing lens, according to the present invention, includes a lens mover, a mode selector, and a mode judge. The lens mover moves the photographing lens. The mode selector is for selecting a mode from a plurality of modes, including a lens housing mode where the photographing lens is housed in a housed position which is inside the photographing device. The mode judge determines whether the lens housing mode should be set or not, when the lens housing mode is selected. When the mode judge determines that the lens housing mode should be set, the lens housing mode is set and the lens mover moves the photographing lens to the housed position.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENT

Hereinafter, the preferred embodiment of the present invention is described with reference to the attached drawings.

Figure 1:
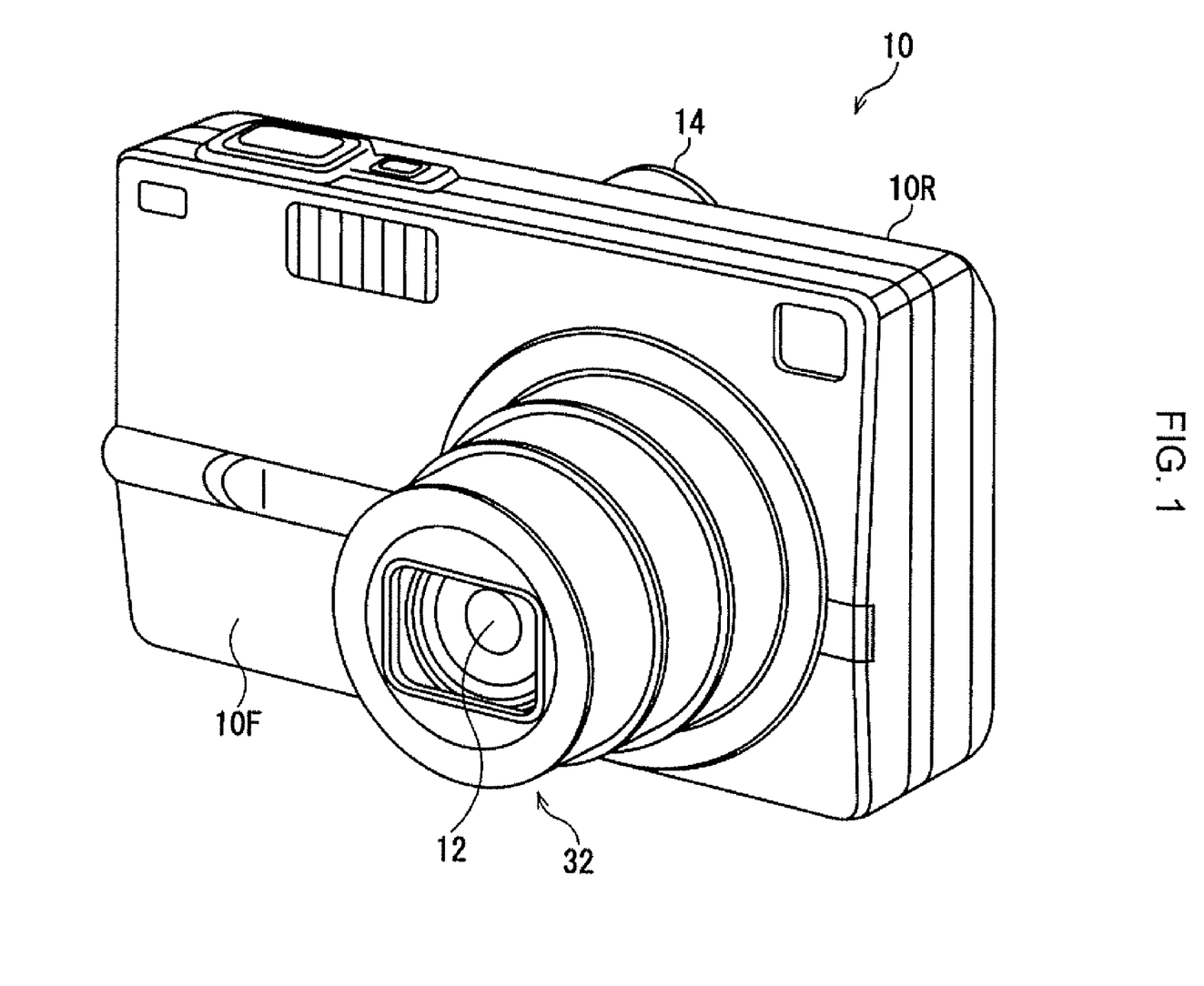
FIG. 1 is a perspective view of a digital camera of an embodiment, in which a photographing lens is extended.
Figure 2:
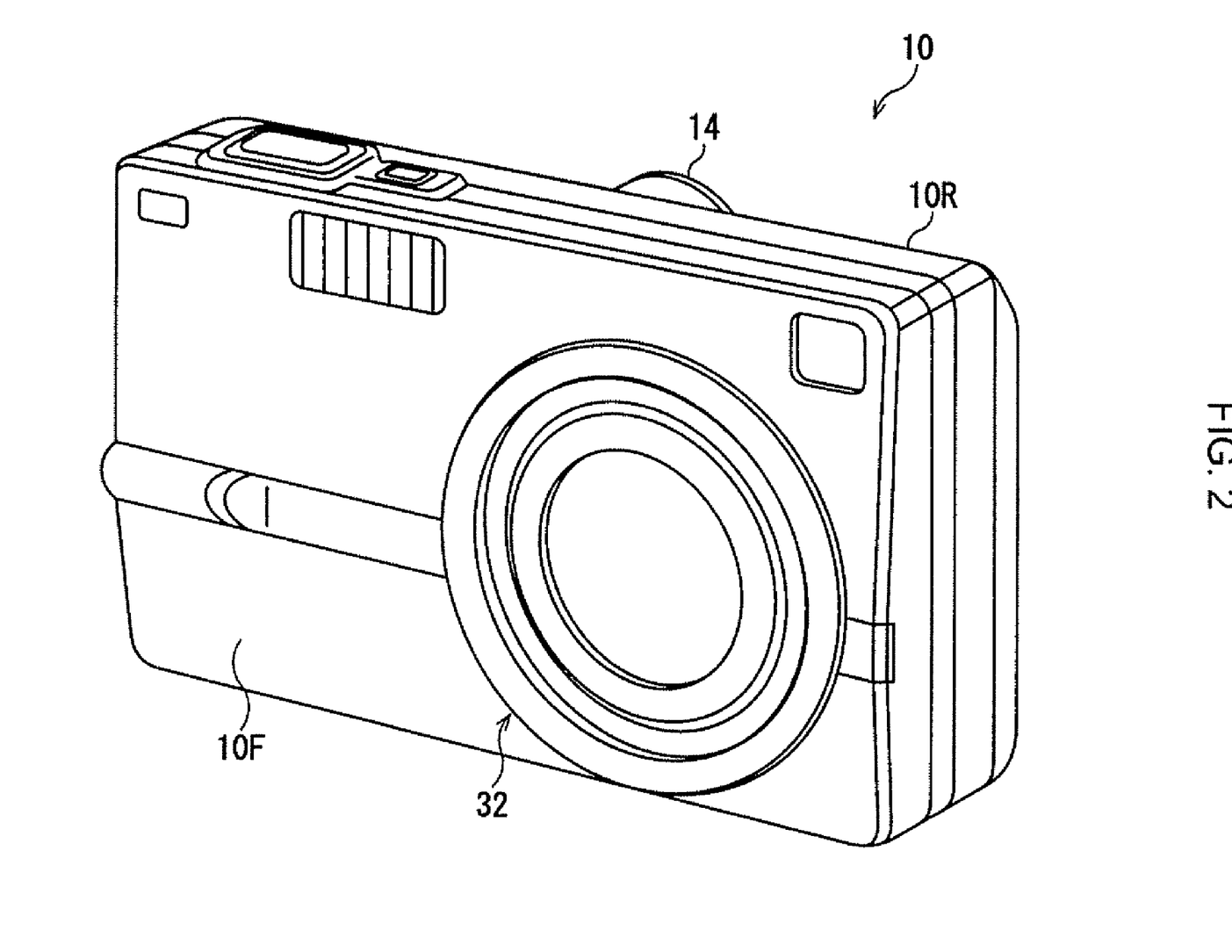
FIG. 2 is a perspective view of the digital camera, in which the photographing lens is housed.

As shown in FIG. 1, in a digital camera 10, a lens barrel 32, including a photographing lens 12, is provided. The photographing lens 12 moves between an extended position, in which it is extended from a front surface 10F of the digital camera 10, and a housed position, in which it is inside the digital camera 10, where the photographing lens 12 becomes invisible from the outside (see FIG. 2).

A mode dial 14 is provided on a rear surface 10R of the digital camera 10. A predetermined mode is selected by the operation of the mode dial 14. When a mode where the photographing lens 12 is not used, is selected, the photographing lens 12 is caused to be moved to the housed position for protecting the photographing lens 12.

Figure 3:
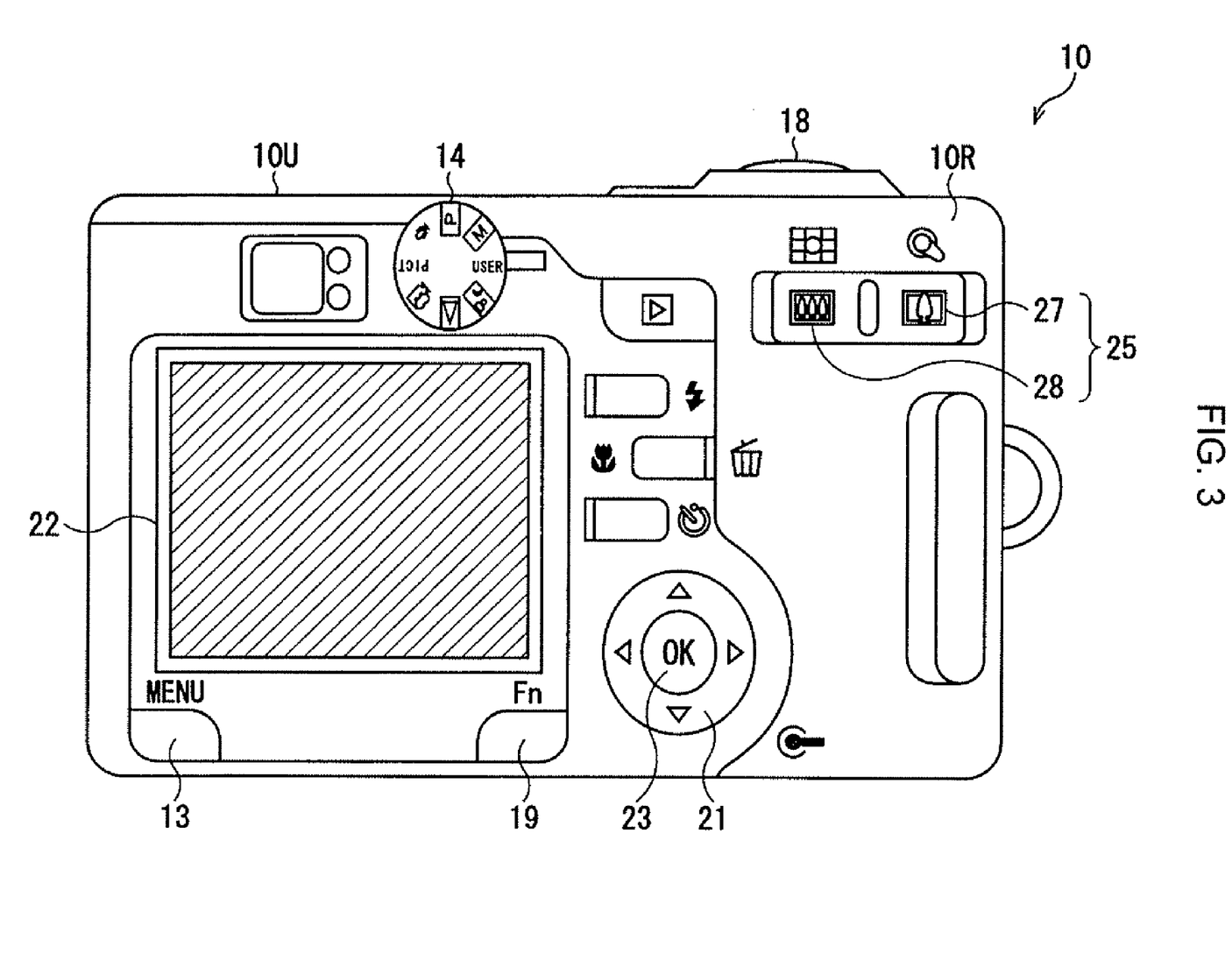
FIG. 3 is a rear view of the digital camera.

As shown in FIG. 3, on the rear surface 10R, a menu button 13, an Fn button 19, a cross key 21, an OK button 23, and a zoom switch 25 are provided. These buttons and switches are for changing various settings based on instructions from a user.

On the rear surface 10R, an LCD monitor 22 is further provided. On the LCD monitor 22, a photographed subject image, a menu screen representing menu items, icons for menu items, and other screen icons are displayed. Note that the menu screen is displayed by the depressing of the menu button 13, and the icons are displayed by the depressing of the Fn button 19.

The cross key 21 is used for selecting a predetermined menu item on the displayed menu screen, and for other actions. The OK button 23 is used for setting a selected menu item, and for other actions. The zoom switch 25 includes a telephoto switch (SWT) 27 on its right side, and a wide angle switch (SWW) 28 on its left side.

On the upper surface 10U of the digital camera 10, a release button 18 is provided. When the release button 18 is half-depressed, a photometry-measuring switch (not shown) is turned on, and when the release button 18 is fully depressed, a release switch (not shown) is turned on.

The mode dial 14 is used for selecting a predetermined mode from a plurality of modes including modes for photographing, and rotates on the rear surface 10R by an operation of a user. On the mode dial 14, marks representing a number of modes, such as a programmed AE mode, a manual exposure mode, a night view mode where an exposure is adjusted for photographing a night view, and a voice-recording mode where voice and sound are recorded, are provided (see FIG. 4). When each of the marks is moved to a mode selecting position that is a predetermined rotation position, the mode represented by that mark in the mode selecting position is selected. The mode selecting position is clearly indicated by a mark represented by an arrow A, marked on the rear surface 10R.

Figure 4:
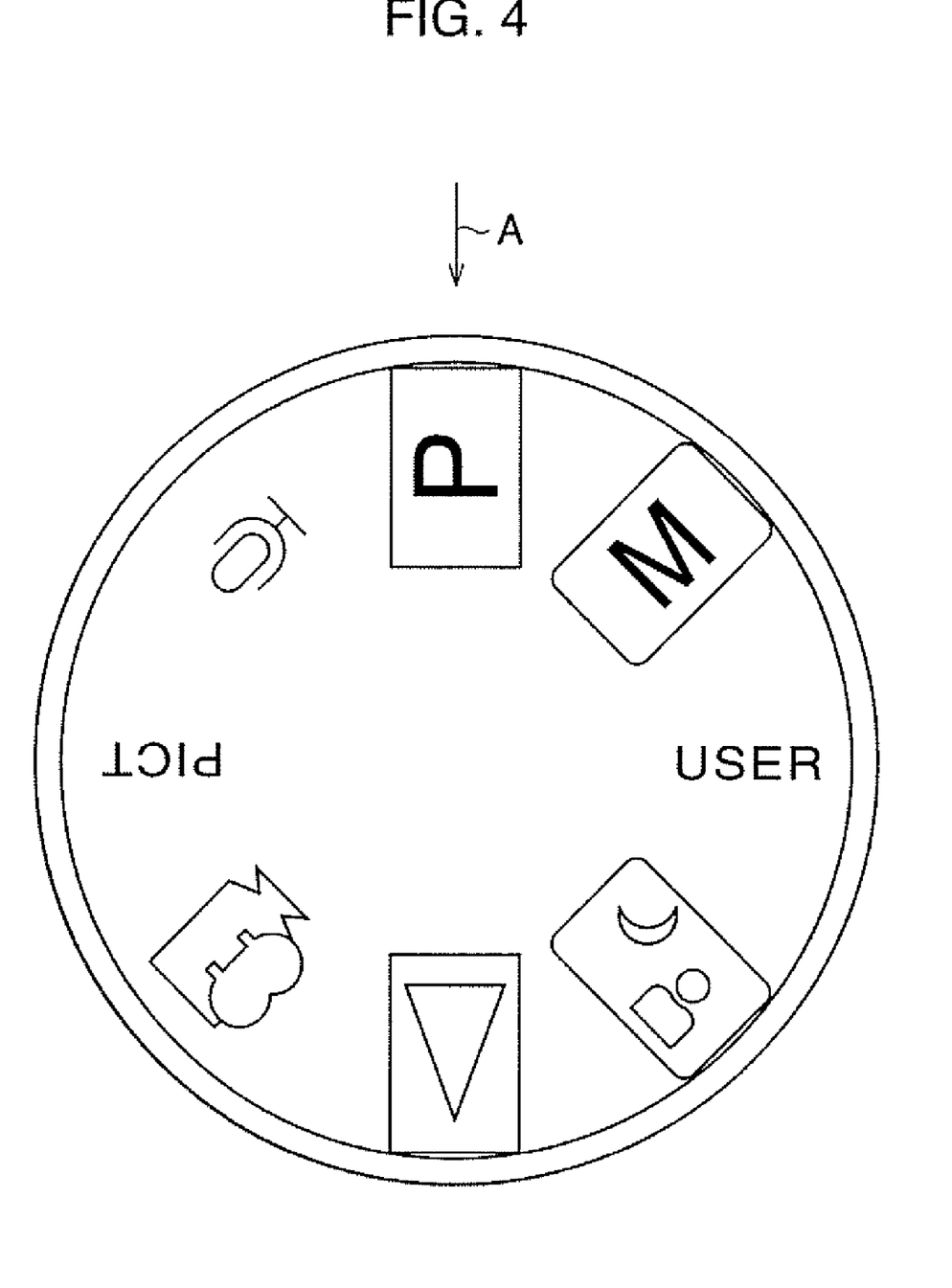
FIG. 4 is a view representing a mode dial provided on a rear surface of the digital camera.

A mark including an alphabet "P" represents the programmed AE mode, a mark including an alphabet "M" represents the manual exposure mode, a mark including a symbol representing the moon represents the night view mode, and a mark representing a simplified microphone represents the voice-recording mode.

The mode dial 14 is endless, that is, the mode dial 14 can rotate continuously both in left and right directions. Therefore, a user can select a desirable mode smoothly by rotating the mode dial 14 in either the left or the right direction.

Figure 5:
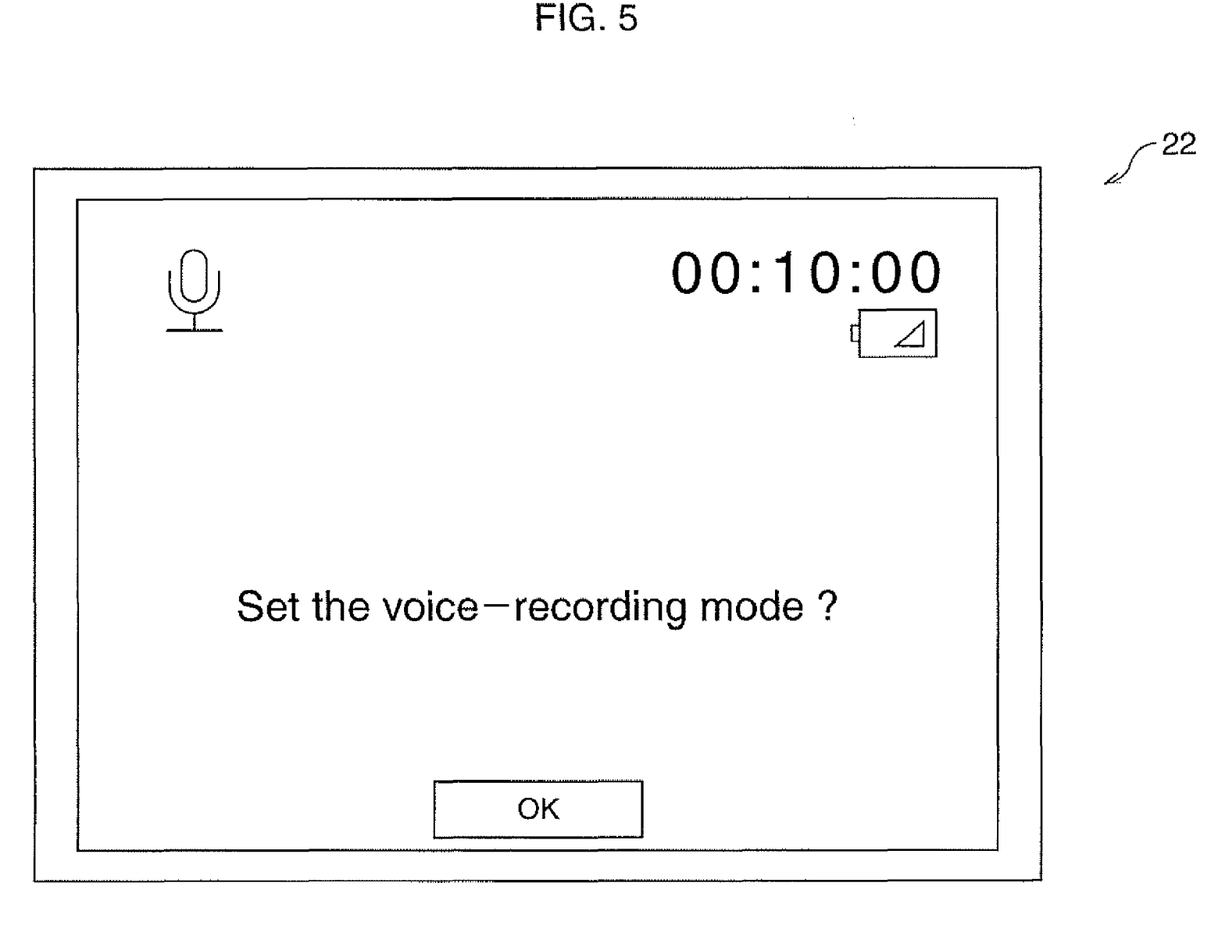
FIG. 5 is a view representing a confirmation screen displayed on a LCD monitor for confirming the setting of a voice-recording mode.

When a mode where the photographing lens 12 should be housed, including the voice-recording mode, is selected by the operation of the mode dial 14, a message screen is displayed on the LCD monitor 22 (see FIG. 5). Hereinafter, such a mode where the photographing lens 12 should be housed is named a lens housing mode, and a mode other than a lens housing mode, that is, a mode where the photographing lens 12 is in the extended position, is named a lens extending mode. The message on the screen confirms that the user is actually going to set the lens housing mode, in this example, the voice-recording mode.

This message screen, named a confirmation screen hereinafter, is displayed because the mode dial 14 is endless, therefore, when the mark of a lens housing mode such as the voice-recording mode is in the mode selecting position, the user may not necessarily intend to set the lens housing mode, and the mode dial 14 may rotate further.

That is, the confirmation screen exemplified in FIG. 5 is being displayed for confirming the intention of the user, whether setting the lens housing mode such as the voice-recording mode is required or setting the lens housing mode is not required and the mark representing the voice-recording mode is simply temporarily positioned at the mode selecting position for setting a mode.

Figure 6:
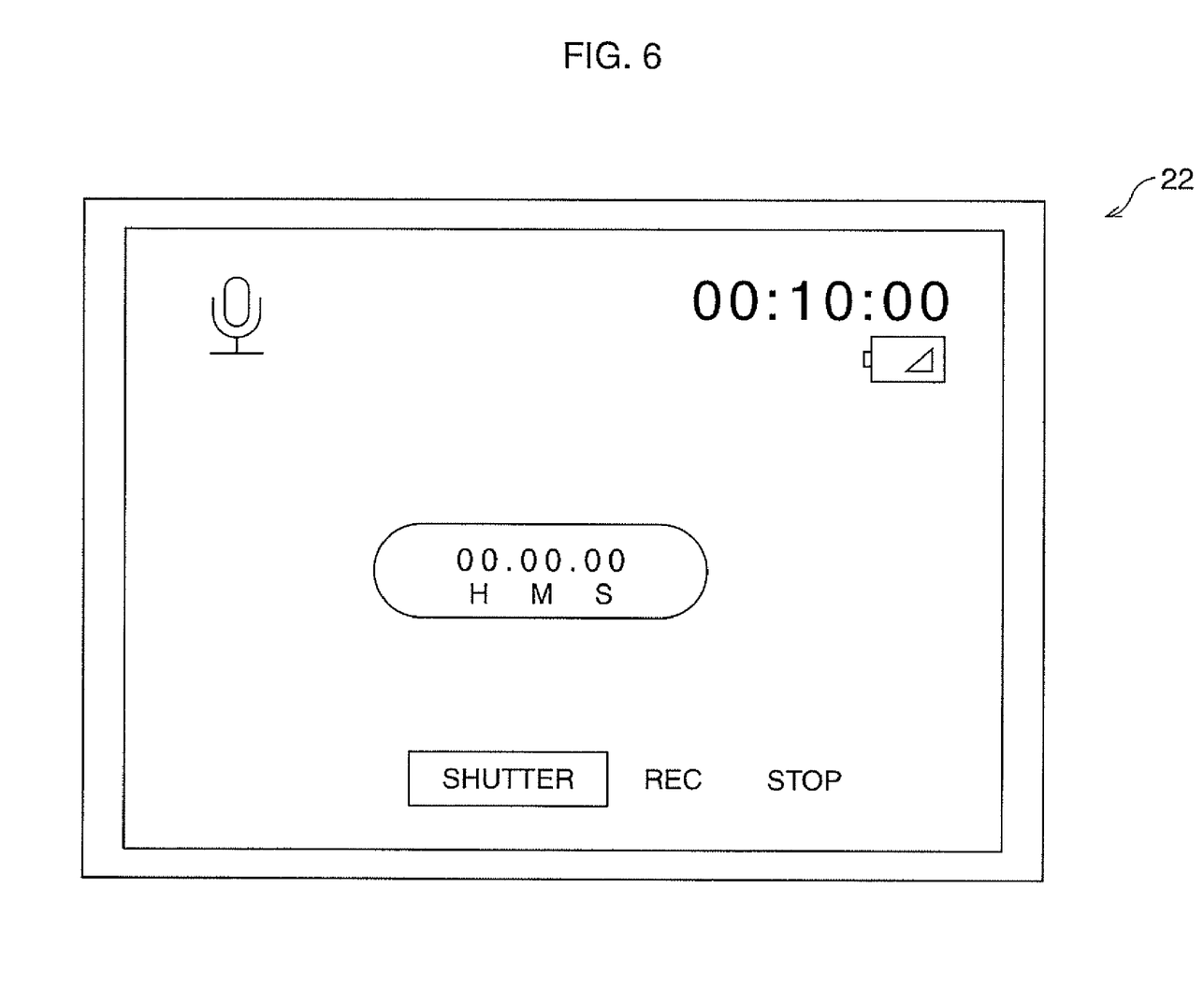
FIG. 6 is a view representing a mode set screen displayed on the LCD monitor for representing that the voice-recording mode has been set.

If while the confirmation screen in FIG. 5 has been displayed, the OK button 23 is depressed or the release button 18 is fully depressed, it is assumed that the user intends to set the voice-recording mode, and the voice-recording mode is set. When the voice-recording mode is set, the confirmation screen disappears, and another message screen, exemplified in FIG. 6, is displayed on the LCD monitor 22 for representing that the S voice-recording mode has been set. Hereinafter, the message screen exemplified in FIG. 6 is named a mode set screen. The mode set screen is displayed on the LCD monitor for representing that the voice-recording mode has been set.

When the voice-recording mode is set by depressing the OK button 23, an operation for recording a voice and a sound by a microphone (not shown) provided inside the digital camera 10 starts by fully depressing the release button 18. Then, when the release button 18 is fully depressed again, the operation for recording a voice and a sound ends. On the other hand, when the voice-recording mode is set by fully depressing the release button 18, unlike with the above-mentioned mode setting, the operation for recording a voice and a sound starts without any additional operation.

After the confirmation screen in FIG. 5 is displayed, when the mode dial 14 is further rotated and another mark representing a mode other than the voice-recording mode moves to the mode selecting position, it is determined that the user does not intend to set the voice-recording mode. Then, the voice recording is not set, and the confirmation screen shown in FIG. 5 disappears.

By confirming whether the lens housing mode is required or not as mentioned above, needless power consumption and operation time extension due to unnecessary movements of the photographing lens 12 can be prevented.

Note that the operability of the mode dial mechanism in this embodiment is improved, because the LCD monitor 22 on which the confirmation screen for determining whether a lens housing mode should be set or not is displayed, the mode dial 14, and the OK button 23 are provided on the same surface of the digital camera 10, the rear surface 10R (see FIG. 3).

Figure 7:
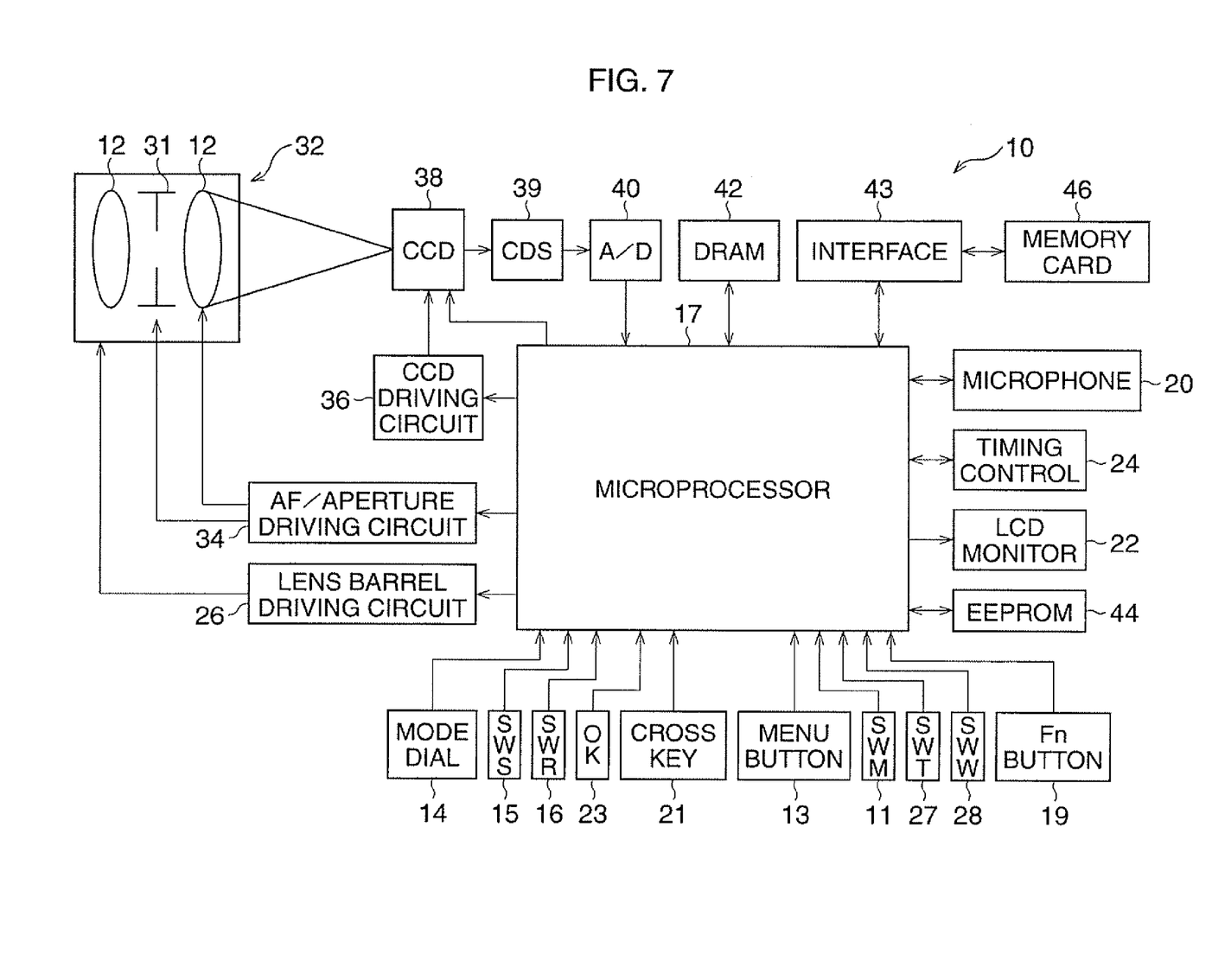
FIG. 7 is a block diagram of the digital camera.

In the digital camera 10, a microprocessor 17 for controlling the entire digital camera 10 is provided (see FIG. 7). When a main switch (SWM) 11 is turned on by a user, the digital camera 10 starts. To the microprocessor 17, the menu button 13, the mode dial 14, a photometry-measuring switch (SWS) 15, a release switch (SWR) 16, the Fn button 19, the cross key 21, the OK button 23, are connected. From these buttons and switches, predetermined signals according to operations of a user are transmitted to the microprocessor 17.

For examples when the menu button 13 is depressed, command signals for displaying the menu screen are transmitted; when the Fn button 19 is depressed, command signals for displaying icons for menu items are transmitted; and when the telephoto switch (SWT) 27 or the wide angle switch (SWW) 28 is depressed, command signals for telephoto-graphing or wide angle photographing are transmitted to the microprocessor 17.

Note that in an EEPROM 44, various data that are for signal processing at the microprocessor 17 and that are read according to modes set by the mode dial 14 and so on, are stored. In photographing modes, such as the programmed AE mode, a subject image is displayed on the LCD monitor 22, as explained below.

First, a CCD 38 receives light that is reflected by a subject and transmitted through the photographing lens 12, and electric charges corresponding to the subject are generated at a plurality of pixels arranged in the CCD 38. The electric charges are read from the CCD 38 based on the control of a CCD driving circuit 36. The read electric charges, that is, image signals are processed to reduce noise at a CDS circuit 39, and are converted from analog signals to digital signals by an A/D converter 40. The digitalized image signals are transmitted to the microprocessor 17.

At a signal processing circuit (not shown) in the microprocessor 17, various processes are carried out on the image signals, such as white balance adjustment, gamma correction, and so on, and then luminance signals and color-difference signals are generated. The generated luminance signals and color-difference signals, that is, image data, are stored in a DRAM 42. Generation of the image data is periodically updated, so that a real-time image is displayed on the LCD monitor 22 as a through image.

When the release button 18 (see FIG. 3) is half-depressed and the photometry-measuring switch 15 is turned on, an AF/aperture driving circuit 34 is controlled by the microprocessor 17. In the microprocessor 17, an exposure value is calculated under a predetermined algorithm and based on the luminance signals transmitted from the CCD 38.

Further, when the release button 18 is fully depressed and the release switch 16 is turned on, an aperture value for an aperture 31 is set based on the calculated exposure value by the microprocessor 17. The aperture 31 is opened by a predetermined amount corresponding to the set aperture value, by the AF/aperture driving circuit 34 based on the control signals from the microprocessor 17, and a shutter (not shown) is opened to the predetermined position for a predetermined time. Then, the CCD 38 is exposed by the reflected light from a subject, which enters through the photographing lens 12.

Based on the image signals, image data are generated in the microprocessor 17, and are stored in the DRAM 42. When a memory card 46 is inserted into a body (not shown) of the digital camera 10, image data are also transmitted to the memory card 46 via an interface 43, and are stored in the memory card 46.

When signals representing that the voice-recording mode has been selected by the rotation of the mode dial 14 are transmitted to the microprocessor 17, command signals for display of the confirmation screen exemplified in FIG. 5 are transmitted to the LCD monitor 22 by the microprocessor 17. Then, if the release button 18 is fully depressed or the OK button 23 is depressed while the confirmation screen is displayed, signals representing that the voice-recording mode should be set are received by the microprocessor 17. At that time, command signals for display of the mode set screen representing that the voice-recording mode has been set, as exemplified in FIG. 6, are transmitted to the LCD monitor 22 by the microprocessor 17. In the area around the center of the mode set screen, the recording time is shown (see FIG. 6). FIG. 6 shows a situation in which the recording time is "0", that is, recording a voice/sound has not yet started, and after the recording starts, the calculated recording time would be shown in seconds.

The microprocessor 17 transmits command signals to start recording to the microphone 20, soon after the voice-recording mode is set by the full depression of the release button 18, or when the release button 18 is fully depressed after the voice-recording mode has been set by the depression of the OK button 23. During the voice recording, when the release button 18 is again fully depressed, the microprocessor 17 transmits command signals to quit recording to the microphone 20. As a result, information on the voice and sound is generated, and the generated information is transmitted to the memory card 46 via the microprocessor 17 and the interface 43, and stored in the memory card 46.

Further, when the voice-recording mode is set, a lens barrel driving circuit 26 is controlled by the microprocessor 17, so that the lens barrel 32, including the photographing lens 12, is moved, and the photographing lens 12 is housed. The photographing lens 12 is then housed until another mode in which the photographing lens 12 should be extended is selected by further rotating the mode dial 14.

Note that the lens housing mode includes a replay mode where a subject image based on the image data stored in the DRAM 42 is replayed and displayed on the LCD monitor 22, and a time display mode, where the current time is displayed on the LCD monitor 22. To enable the time display mode, in the digital camera 10, a timing control circuit 24, including a system clock (not shown), is provided.

When the replay mode or the time display mode is selected, a confirmation screen for confirming whether the mode is to be set or not (see FIG. 5), and a mode set screen that represents that each mode has been set (see FIG. 6), are displayed on the LCD monitor 22, in the same manner as when the voice-recording mode is selected and set. Therefore, when each of these lens housing modes is only selected, the photographing lens 12 is in the extended position, and after setting the lens housing mode, the photographing lens 12 is housed.

A mode-setting control routine (see FIG. 8) starts when the main switch 11 of the digital camera 10 is turned on. At step S10, it is determined whether a lens housing mode is selected by rotating the mode dial 14 or not, and when it is determined that the lens housing mode is selected, the process proceeds to step S11, and when it is determined that a lens housing mode is not selected, the process proceeds to step S12. At step S11, the confirmation screen is displayed on the LCD monitor 22, and the process proceeds to step S13.

Figure 8:
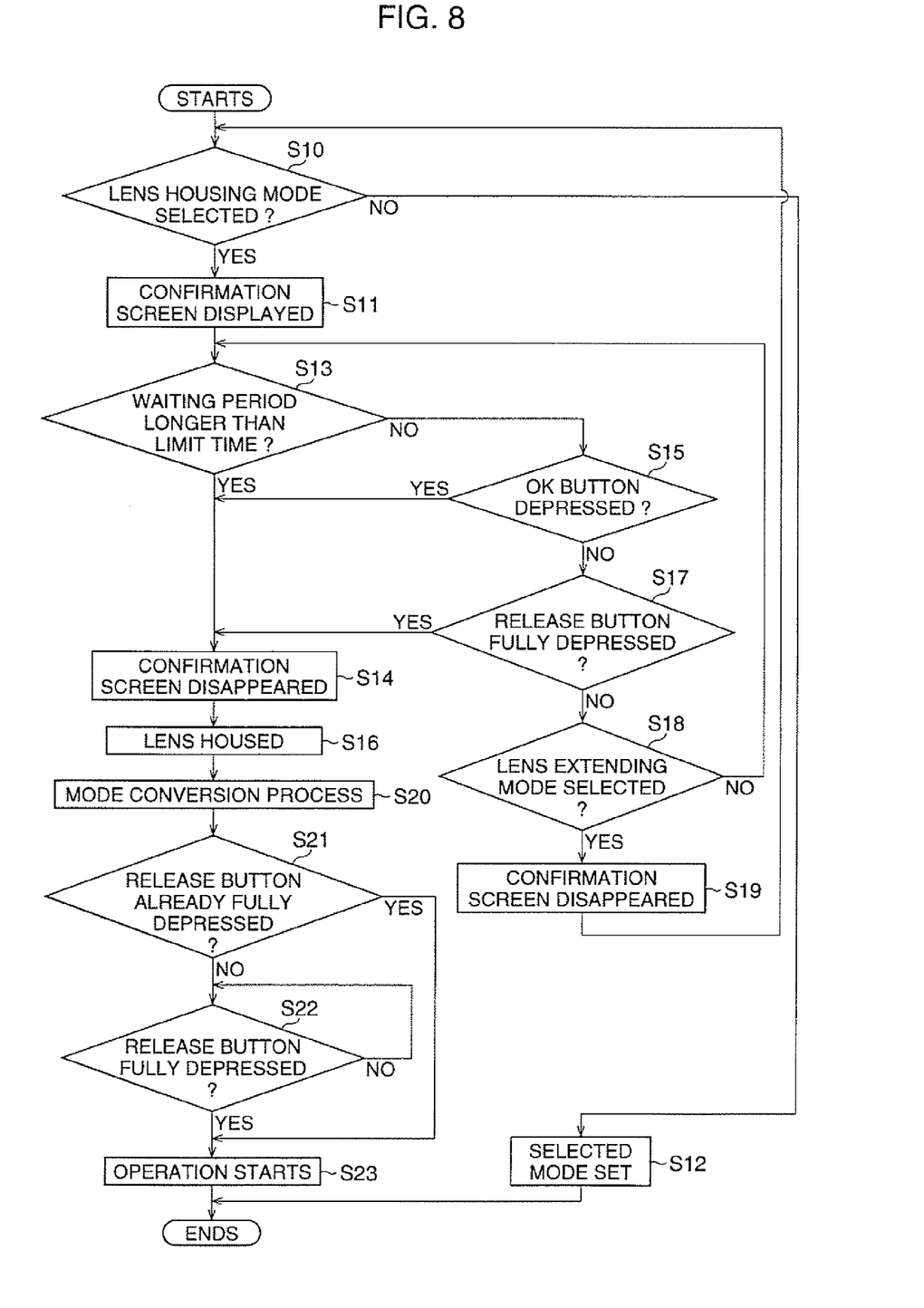
FIG. 8 is a flowchart representing a mode-setting control routine for the mode dial mechanism.

At step S13, a waiting period from when the confirmation screen is displayed to when a next operation by a user, such as an operation of a button or a switch, is carried out is calculated based on the system clock, and it is determined whether the calculated waiting period is longer than a predetermined limit time or not by the microprocessor 17. When it is determined that the waiting period is longer than the limit time, the process proceeds to step S14, and when it is determined that the waiting period is not longer than the limit time, the process proceeds to step S15.

At step S14, it is determined that the lens housing mode should be set by the microprocessor 17. Therefore, the confirmation screen disappears because it has becomes unnecessary, and the process proceeds to step S16. On the other hand, at step S15, it is determined whether the OK button 23 has been depressed or not. When it is determined that the OK button 23 has been depressed, the process proceeds to step S14, and when it is determined that the OK button 23 has not been depressed, the process proceeds to step S17. At step S17, it is determined whether the release button 18 is fully depressed or not. When it is determined that the release button 18 is fully depressed, the process proceeds to step S14, and when it is determined that the release button 18 is not fully depressed, the process proceeds to step S18.

At step S18, it is determined whether a mark for a lens extending mode is in the mode selecting position by further rotating the mode dial 14 or not, that is, it is determined whether a lens extending mode is newly selected or not. When it is determined that the mark for a lens extending mode is in the mode selecting position and an extended mode is newly selected, the process proceeds to step S19. When it is determined that a lens extending mode is not newly selected and a lens housing mode has been selected, the process returns to step S13. At step S19, the confirmation screen disappears, and the process returns to step S10.

At step S16, the photographing lens 12 is housed in the housed position, and the process proceeds to step S20. At step S20, processes relating to mode conversion, that is, relating to setting a new mode, such as displaying a mode set screen representing that a lens housing mode has been newly set on the LCD monitor 22, and other processes are carried out. Then the process proceeds to step S21.

At step S21, it is determined whether the release button 18 was already fully depressed at step S18 or not. When it is determined that the release button 18 was already fully depressed at step S18, the process proceeds to step S23, and when it is determined that the release button 18 was not fully depressed at step S18, the process proceeds to step S22.

At step S22, it is determined whether the release button 18 is fully depressed or not. When the release button 18 is fully depressed, the process proceeds to step S23. At step S23, predetermined operations corresponding to a lens housing mode which is selected at step S10 start, and then the mode-setting control routine ends. At step 512, a selected mode that is one of the lens extending modes is set, and then the mode-setting control routine ends.

As explained above, in the case in which the release button 18 was already fully depressed at step S17, a lens housing mode is set, and operations in the mode newly set, such as voice recording in the voice-recording mode, immediately start (see steps S21 to 23 in FIG. 8). Therefore, setting a desirable mode and starting operations in the set mode can be carried out by a single operation, such as fully depressing the release button 18, and the operational convenience of the digital camera 10 is increased.

In this embodiment, when a lens housing mode where the photographing lens 12 should be housed is selected by the operation of the mode dial 14, by confirming whether the lens housing mode is going to be set or not before housing the photographing lens 12, unnecessary movements of the photographing lens 12 can be prevented, and the operational convenience of the mode dial mechanism 14 can be increased.

Figure 9:
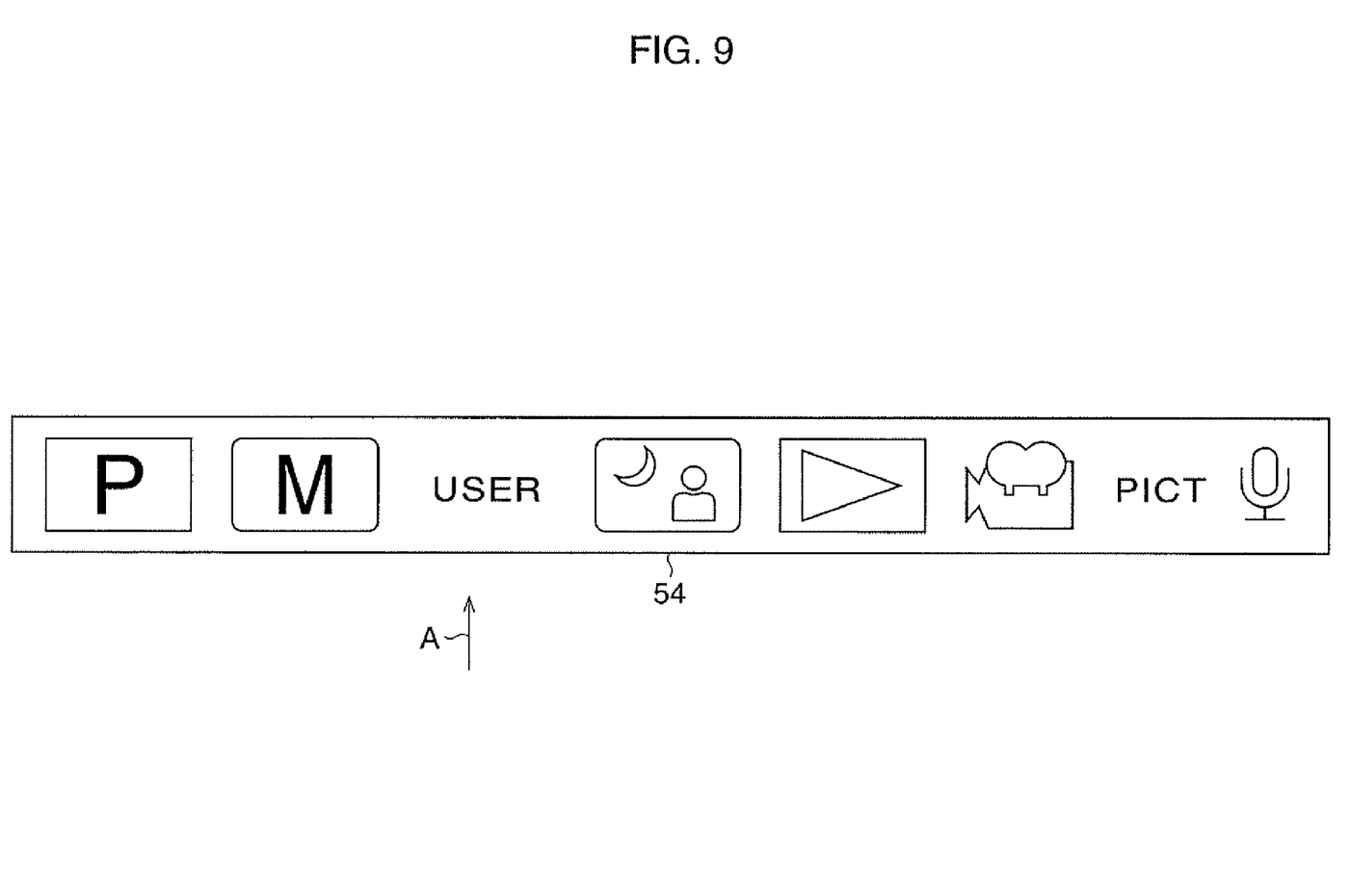
FIG. 9 is a view representing a sliding member as a part of a mode-setting device.

Photographing devices in which a mode dial mechanism is provided, are not limited to the digital camera 10. For example, the mode dial mechanism may be provided in a video camera and other devices. Further, a sliding member 54 as a part of a mode-setting device that slides in a line, and that has marks representing a lens housing mode and a lens extending mode can be adopted instead of a mode dial in a photographing device, where a selected lens housing mode should be actually set or not is to be confirmed (see FIG. 9). Nevertheless, the mode dial 14 in the embodiment has superior operability compared to the sliding member 54, because a mode dial is endless, whereas such a sliding member can not be endless. Below the sliding member 54, a mark such as an arrow A representing the mode selecting position, is set on a surface of a photographing device.

The invention is not limited as described in the preferred embodiment, namely, various improvements and changes may be made to the present invention without departing from the spirit and scope thereof.

The present disclosure relates to subject matter contained in Japanese Patent Application No. 2005-184666 (filed on Jun. 24, 2005), which is expressly incorporated herein, by reference, in its entirety.

The invention claimed is:

1. A mode dial mechanism for a photographing device comprising a photographing lens, said mode dial mechanism comprising;

a lens mover that moves said photographing lens;

a mode dial for selecting a mode from a plurality of modes, including a lens housing mode where said photographing lens is housed in a housed position which is inside said photographing device; and a mode judge that determines, based on an instruction of a user, whether said lens housing mode should be set or not, when said lens housing mode is selected;

wherein when said mode judge determines that said lens housing mode should be set, said lens housing mode is set and said lens mover moves said photographing lens to said housed position.

2. The mode dial mechanism according to claim 1, wherein said mode dial is endless so that said mode dial can be rotated in both left and right directions without being stopped.

3. The mode dial mechanism according to claim 1, wherein said mode judge comprises a message display that displays a message for asking a user whether selected said lens housing mode should be set or not.

4. The mode dial mechanism according to claim 3, wherein said mode judge determines whether selected said lens housing mode should be set or not, based on an operation of a user in response to said message.

5. The mode dial mechanism according to claim 4, wherein said mode judge determines that said lens housing mode should not be set, when said message is displayed and a mode other than said lens housing mode is selected by an operation of said mode dial.

6. The mode dial mechanism according to claim 3, further comprising a timer that measures a displayed time that is a continuous time during which said message is displayed, wherein said mode judge determines that said lens housing mode should be set when said displayed time is longer than a predetermined time limit.

7. The mode dial mechanism according to claim 3, wherein said mode dial and said message display are provided on a same surface of said photographing device.

8. The mode dial mechanism according to claim 1, further comprising a voice recorder that records a voice, wherein a voice-recording mode where a voice is recorded by said voice recorder is included in said lens housing mode.

9. A mode-setting device for a photographing device comprising a photographing lens, said mode-setting device comprising;

a lens mover that moves said photographing lens;

a mode selector for selecting a mode from a plurality of modes, including a lens housing mode where said photographing lens is housed in a housed position which is inside said photographing device; and a mode judge that determines, based on an instruction of a user, whether said lens housing mode should be set or not, when said lens housing mode is selected;

wherein when said mode judge determines that said lens housing mode should be set, said lens housing mode is set and said lens mover moves said photographing lens to said housed position.

* * * * *